United States Patent [19]

Atsukawa et al.

[11] 4,302,431

[45] Nov. 24, 1981

[54] PROCESS FOR CONTROLLING NITROGEN OXIDES IN EXHAUST GASES AND APPARATUS THEREFOR

[75] Inventors: Masumi Atsukawa; Kazuhiro Matsumoto; Toru Seto; Toshikuni Sera; Naohiko Ukawa, all of Hiroshima, Japan

[73] Assignee: Mitsubishi Jukogyo Kabushiki Kaisha, Tokyo, Japan

[21] Appl. No.: 151,814

[22] Filed: May 21, 1980

Related U.S. Application Data

[62] Division of Ser. No. 964,893, Nov. 30, 1978, abandoned.

[30] Foreign Application Priority Data

Dec. 2, 1977 [JP] Japan ................................. 52-144012

[51] Int. Cl.³ ............................................. B01D 53/36
[52] U.S. Cl. ................................ 423/239; 422/171; 422/172
[58] Field of Search .................... 423/235, 237, 239 A

[56] References Cited

U.S. PATENT DOCUMENTS 3,970,739  7/1976  Shiraishi et al. ................ 423/239
4,081,510  3/1978  Kato et al. ..................... 423/237
4,102,980  7/1978  Sasaki et al. ................... 423/239
4,129,651  12/1978  Kolke et al. ................... 423/235
4,193,972  3/1980  Pohlenz ......................... 423/239 X Primary Examiner—G. O. Peters
Attorney, Agent, or Firm—Wyatt, Gerber, Shoup, Scobey & Badie

[57] ABSTRACT

In a process and an apparatus for controlling oxides of nitrogen in exhaust gases from combustion equipment by decomposing the oxides, in the presence of oxygen, with ammonia blown into the equipment and associated ducting at temperatures within the range from 700° to 1300° C., a catalyst assembly is arranged, with the catalytic surfaces of the component units substantially in parallel to the direction of exhaust gas flow, in a region where the temperature of the gas after the decomposing treatment is between 300° and 500° C., and the gas after the decomposing treatment is caused to pass through the catalyst assembly to decompose residual nitrogen oxides and ammonia in the gas to innocuous substances. An additional supply of ammonia, in an amount from 0.5 to 1.5 times equivalent (in molar ratio) to the amount of nitrogen oxides in moles in the gas is introduced into the space immediately upstream of the catalyst assembly, thereby to accelerate the decomposition of the oxides in the gas to make it harmless.

2 Claims, 5 Drawing Figures

PROCESS FOR CONTROLLING NITROGEN OXIDES IN EXHAUST GASES AND APPARATUS THEREFOR

This is a division of application Ser. No. 964,893 filed Nov. 30, 1978 now abandoned.

This invention relates to improvements in a process and an apparatus for controlling nitrogen oxides in exhaust gases from combustion equipment through decomposition of the oxides to harmless substances. More particularly, the invention concerns a process and an apparatus for efficiently removing residual matter such as ammonia from the gases after subjection to noncatalytic denitrification at elevated temperature.

Recently, the harmful effects upon the human health of the oxides of nitrogen (hereinafter called NOx) in the gases that result from combustion processes have posed a serious problem, and a number of ways have hitherto been proposed to eliminate the noxious contents from the emissions. Among those proposals, one technique that is attracting growing attention these days consists of bringing exhaust gas and ammonia into contact, in the presence of oxygen, at a high temperature in the range from 700° to 1100° C. (the process being hereinafter called high-temperature noncatalytic denitrification). (Refer, for example, to Japanese Patent Application Disclosure No. 7774/75.) The process, which does not require any catalyst, has no such concomitant problem as an increase in pressure loss due to the replacement of catalyst or to dust deposition. This leads to an advantage of the ability of easily decomposing NOx in exhaust gases through selection of a suitable temperature range and ammonia proportion. However, when actually applied in the treatment of exhaust gases from boilers and the like, the process presents the following disadvantages:

(1) That some ammonia is left unremoved in the treated gas;

(2) Low NOx decomposition rate; and (3) Large ammonia consumption.

The disadvantages (1) and (2) are correlated. For example, if the ammonia supply is increased in order to raise the NOx decomposition rate, the proportion of residual ammonia in the treated gas will be high.

Besides, variation in the load on the combustion equipment will change the temperature, at the point where ammonia is introduced, to a value deviated from the optimum temperature range, and this in turn will decrease the decomposition rate, tending to increase the proportion of residual ammonia. Even in a small proportion, the residual ammonia will react rapidly with the sulfuric acid content of the exhaust gas to produce acid ammonium sulfate. This product will stick to the rear heat-transfer surface in the relatively low-temperature region, for example, to the heating surfaces of the air preheater and associated parts of a boiler, causing an increase in pressure loss, hampering the operation of the combustion equipment, and attacking the materials of the equipment for their eventual corrosion.

As described above, the ammonia left unremoved in the treated exhaust gas provides a major obstacle in the way to practical operation. Consequently, there is an upper limit to the ammonia supply and naturally the NOx decomposition rate is low. This has been a problem in the practice of high-temperature noncatalytic denitrification. Furthermore, ammonia, which is introduced in the high-temperature region, undergoes a concomitant reaction for decomposing itself, resulting in the disadvantage (3) of excess consumption of ammonia, or more than the equivalent for the NOx-decomposing reaction. This tendency will be pronounced as the amount of ammonia injection is increased in anticipation of an enhanced decomposition rate. This has been another limiting factor for the rate of NOx decomposition to be attained conventionally.

The present invention has for its object to provide a process and an apparatus for overcoming the aforedescribed difficulties and efficiently decomposing NOx in exhaust gases to harmless substances, by taking full advantage of the high-temperature noncatalytic denitrification.

In realizing the object, the invention provides the process and apparatus as defined below:

(1) In a process for controlling NOx in exhaust gases from combustion equipment by decomposing the NOx, in the presence of oxygen, with ammonia blown into the equipment and associated ducting at temperatures within the range from 700° to 1300° C., the improvement which comprises arranging a catalyst assembly, with the catalytic surfaces of the component units substantially in parallel to the direction of gas flow, in a region where the temperature of the gas after the decomposing treatment is between 300° and 500° C., and causing the gas after the decomposing treatment to pass through the catalyst assembly, thereby decomposing residual NOx and ammonia in the gas to innocuous substances.

(2) In a process for controlling NOx in exhaust gases from combustion equipment by decomposing the NOx, in the presence of oxygen, with ammonia blown into the equipment and associated ducting at temperatures within the range from 700° to 1300° C., the improvement which comprises arranging a catalyst assembly, with the catalytic surfaces of the component units substantially in parallel to the direction of gas flow, in a region where the temperature of the gas after decomposing treatment is between 300° and 500° C., so that the gas after the decomposing treatment may pass through the catalyst assembly, and introducing an additional supply of ammonia, in an amount from 0.5 to 1.5 times equivalent (in molar ratio) to the amount of NOx in moles in the gas, into the space immediately upstream of the catalyst assembly, thereby to accelerate the decomposition of NOx in the gas to harmless substances.

(3) An apparatus for controlling NOx in exhaust gases from combustion equipment which comprises, in combination, a front stage including nozzles installed in a high-temperature region of the equipment to supply ammonia for decomposing the NOx in the presence of oxygen, and a rear stage including an assembly of catalyst units installed in a relatively low-temperature region at which the gas arrives after a decomposing treatment, said catalyst unit being of such a shape that the catalytic surfaces are substantially parallel to the direction of gas flow so as to decompose residual ammonia and NOx simultaneously.

(4) An apparatus for controlling NOx in exhaust gases from combustion equipment which comprises, in combination, a front stage including nozzles installed in a high-temperature region of the equipment to supply ammonia for decomposing the NOx in the presence of oxygen, and a rear stage including an assembly of catalyst units installed in a relatively low-temperature region at which the gas arrives after a decomposing treatment, said catalyst units being of such a shape that the catalytic surfaces are substantially parallel to the direction of gas flow so as to decompose residual ammonia and NOx simultaneously, and additional ammonia-supplying nozzles installed near the entrance of the catalyst assembly.

The invention will now be described in more detail in conjunction with the accompanying drawings, in which.

Figure 1:
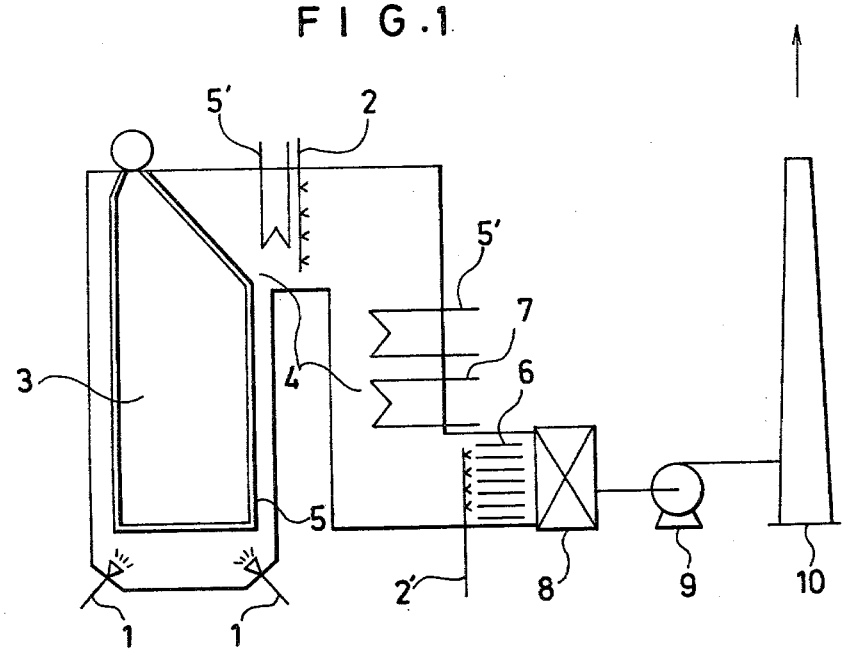
FIG. 1 is a schematic diagram of an embodiment of the invention as applied to the treatment of flue gas from a boiler.

Referring to FIG. 1, main burners 1 that are supplied with air and fuel are shown producing NOx-containing combustion gas. Recovery of heat from the gas is normally accomplished by flowing a heat-recovery fluid through heat-transfer tubings 5 and 5' installed, respectively, in a radiation zone 3 and convection zones 4. The temperature range of exhaust gases suited for the injection of ammonia for high-temperature noncatalytic denitrification, therefore, usually resides in the exhaust gas ducts of the convection zones 4. In other words, the range that prevails in the duct sections between the rear flow part of the radiation zone 3 and the space occupied by a catalyst assembly 6 to be described later, where the combustion gas temperature ranges from 700° to 1300° C., is desirable. The ammonia for high-temperature noncatalytic denitrification may be introduced at any point of the ducting provided the temperature therein is within this range. For example, banks of ammonia injection nozzles 2 may be mounted in the location shown in FIG. 1. Inside the ducting, the ammonia contacts NOx in the gas stream and undergoes reactions for decomposing the NOx.

While the decomposition reactions themselves generally proceed at high velocities, the rapid and thorough mixing of ammonia with NOx is actually rendered difficult by the phenomenon of gas flow deviation and un-uniformity in NOx distribution. These factors sometimes combine with uneven distribution of oxygen concentration to make it very difficult to mix a large volume of exhaust gas thoroughly and rapidly with a small amount of ammonia (from 0.5 to 2.0 times the total amount of NOx).

To overcome these difficulties, it has been attempted, for example, to increase the amount of ammonia injection or shift the injection point according to variation in load. Such attempts, however, accompany the problems of increased residual ammonia quantity and excess consumption of ammonia, as already stated.

In practice of the present invention, as also illustrated in FIG. 1, a catalyst assembly 6 is installed in the rear stage of the apparatus, with the catalytic surfaces in parallel to the direction of gas flow. For use in this assembly the catalyst units may take any desired shape, such as plates, honeycombs, or tubes, only if their working surfaces extend substantially (or exactly) in parallel to the gas stream.

This catalyst assembly 6 decomposes both ammonia and NOx to harmless substances and eliminates them from the exhaust gas as the latter comes into contact with the catalyst before leaving the apparatus. The emission, made innocuous in this way, is led to an air preheater 8 and an induced draft fan 9 and then released through a stack 10 to the general atmosphere.

The characteristics of the catalyst assembly 6, as composed of plate-shaped units, for example, and the requirements to be met for its installation will be stated in detail below.

(1) Location for installation: Although FIG. 1 shows, by way of exemplification, a catalyst assembly installed behind a fuel economizer 7, this is not a limitation; it may be located elsewhere provided a temperature within the appropriate reaction temperature range (300°–500° C.) is maintained.

Figure 2:
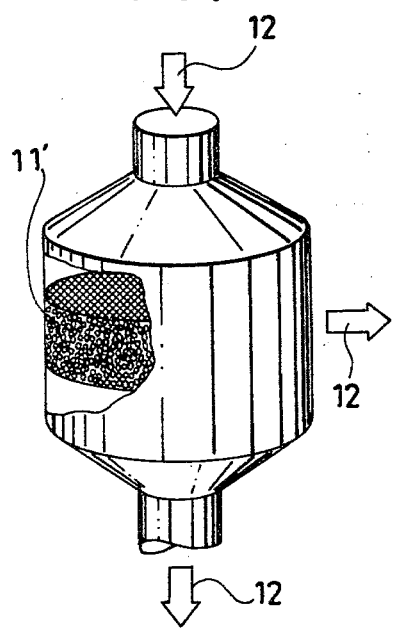
FIG. 2 is a diagrammatic view of a conventional granular catalyst bed.
Figure 3:
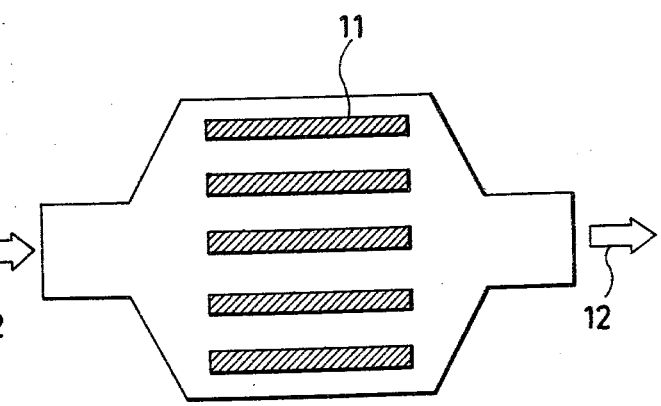
FIG. 3 is a diagrammatic view of an arrangement of catalyst plates according to the invention.

Unlike the commonly employed bed of solid particles 11' as shown in FIG. 2, the catalyst according to the invention is an assemblage of a plurality of catalyst plates 11 arranged in parallel and in a regularly spaced relationship as indicated in FIG. 3. (Refer to the specification of Japanese Patent Application No. 58888/76.) Exhaust gas flows in parallel to, and through the spaces between, those plates. (Arrows 12 in FIGS. 2 and 3 indicate the directions of gas flow.)

The plate-to-plate distance of the catalyst desirably ranges from 5 to 20 mm, and the suitable linear gas velocity is in the range of 3–20 m/sec (as measured in an empty tower), preferably in the high-velocity range of 10–15 m/sec.

Figure 4:
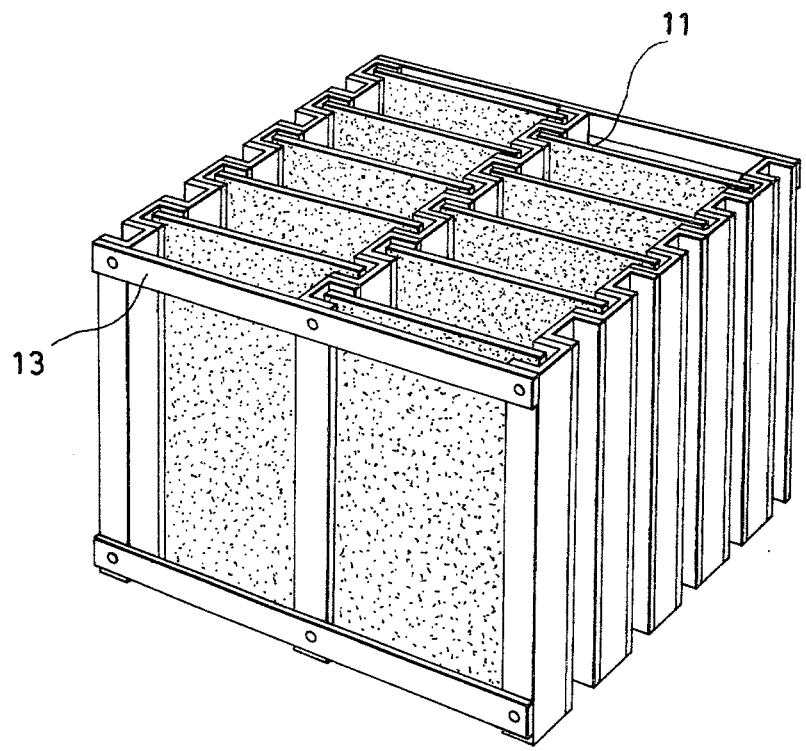
FIG. 4 is a perspective view of a packaged assembly of catalyst plates.

In the majority of instances, the flow velocity of exhaust gas through the ducting of a boiler or the like is within the range above specified, and therefore it is possible to install the plate-like or other shaped catalyst units in the duct. Moreover, the units can be freely arranged as desired, for example, by holding them upright or horizontally, according to the contour of the ducting. This is a great practical advantage in that the apparatus is made accordingly compact in construction. Further, as shown in FIG. 4, a plurality of catalyst plates 11 may be arranged to be a rectangular parallelopipedon supported by a frame structure 13. Packaging in this manner will remarkably facilitate and simplify the mounting, dismounting, and other maintenance work for the catalyst assembly.

(2) Ammonia-NOx decomposition capability: When NOx and ammonia come in contact with a catalyst in the form of plates or the like, reactions for decomposing the both components will occur equivalently, to be followed by a decomposition reaction for excess ammonia. Thus, upon contact of the gas, after the high-temperature noncatalytic denitrification, with the catalytic plates or the like, NOx and ammonia first react to and are decomposed by the catalyst, attaining an improvement in the denitrification rate at which the present invention is originally aimed. Even when gases containing more than the reaction equivalent weight of residual ammonia are treated, the ammonia is broken down and the gases after the contact with the plates are innocuous with little contents of NOx and ammonia. In addition, the adhesion of acid ammonium sulfate, the reaction product of residual ammonia and sulfuric acid, to the heat-transfer surface of a heat exchanger at the rear of the apparatus is reduced. This results in little increase in pressure loss of the heat exchanger, minimum corrosion of the apparatus, and therefore stable operation for a prolonged period and other advantages.

For an even higher degree of denitrification, an additional supply of ammonia may be given as at 2' in FIG. 1 to the gases after the treatment for high-temperature noncatalytic denitrification and just before passing the catalyst assembly. In this case, because the ammonia and NOx in contact with catalyst plates or the like first undergo the decomposition reactions in reaction equivalent weights as already stated, excess ammonia consumption is avoided and a double effect of achieving a high denitrification rate while restricting ammonia consumption is attained.

(3) Soot and dust control: With ordinary reactors packed with a grannular catalyst in wide use, a common disadvantage is the partial choking of the catalyst bed with deposition of soot and dust out of the exhaust gas passing therethrough. This will increase the resistance to the flow of the gas to be treated and can eventually force the operator to stop the equipment. Another disadvantage is a large pressure loss that results from the gas passage through the catalyst bed.

On the other hand, if the gas is flown along the catalytic surfaces of the catalyst units in the form of parallel plates or the like as proposed by the present invention, the soot and dust deposition will be negligible and there will be no increase in pressure loss, because the gas flows at a high velocity and in parallel to the catalytic surfaces. Where exhaust gases with unusually large proportions of soot and dust are to be handled, it is possible to use a steam (or air) blowing device that blows away the deposits from the surfaces with jets of high-pressure steam (or compressed air).

EXAMPLE 1

Figure 5:
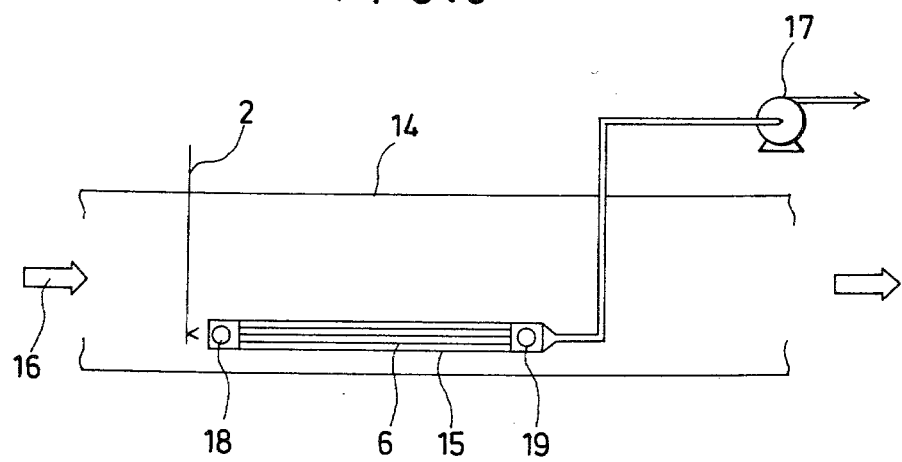
FIG. 5 is a schematic diagram of an apparatus used for Examples of the invention.

As shown in FIG. 5, a reactor 15, packed with catalyst units in the form of plates 11 in spaced relationship, was mounted in a duct 14 at the exit of a fuel economizer. Part of the exhaust gas 16, after high-temperature noncatalytic denitrification, was led through the reactor (at a rate of 700°–2100 Nm$^3$/H) by an induced draft fan 17, and the gas composition was analyzed through two measuring seats 18 and 19 at the inlet and outlet of the reactor. At the measuring seats the inlet oxygen concentration was 24% by volume and the temperature was 360° C.

| Exp. No. | Reactor inlet conc. (ppm) NH$_3$ | Reactor inlet conc. (ppm) NOx | Reactor outlet conc. (ppm) NH$_3$ | Reactor outlet conc. (ppm) NOx | Gas linear velocity (in empty col.) (m/sec) |
|---|---|---|---|---|---|
| 1 | 11 | 85 | 0 | 73 | |
| 2 | 24 | 78 | 0 | 53 | 4 |
| 3 | 45 | 72 | <1 | 27 | |
| 4 | 11 | 85 | 0 | 74 | |
| 5 | 24 | 78 | <1 | 53 | 8 |
| 6 | 24 | 78 | 5 | 58 | 12 |

The catalyst plates were prepared by dipping calcium silicate plates in a ferric solution so that the substrate could carry 10% by weight of ferric sulfate. Four blocks, each consisting of a dozen such plates measuring 0.45 m × 1 m × 10 mm each and arranged in parallel at intervals of 14 mm, were juxtaposed in the gas flow direction.

EXAMPLE 2

In the arrangement of Example 1, ammonia was additionally supplied through nozzles 2' held in the vicinity of the reactor inlet, and the gas composition was analyzed.

| Exp. No. | Reactor inlet conc. (ppm) NH$_3$* | Reactor inlet conc. (ppm) NOx | Reactor outlet conc. (ppm) NH$_3$ | Reactor outlet conc. (ppm) NOx | Gas linear velocity (m/sec) |
|---|---|---|---|---|---|
| 1 | 35 | 75 | 2 | 40 | 8 |
| 2 | 46 | 72 | 3 | 27 | " |
| 3 | 25 | 79 | 0 | 54 | " |

*Concentration after the additional injection of ammonia.

EXAMPLE 3

The outlet of a fuel economizer of an oil fired boiler was branched to obtain a separate flow of the exhaust gas at a rate of 2400 Nm$^3$/h. With the addition of ammonia, the gas was conducted through a reactor packed with the catalyst plates, and changes of the pressure loss with time were measured. The results were as tabulated below.

The composition of the gas treated was as follows.

| Dust | 40–70 | mg/Nm$^3$ |
|---|---|---|
| SOx | 800 | ppm |
| SO$_3$ | 5–15 | ppm |
| NOx | 150 | ppm |
| CO$_2$ | 12 | vol% |
| O$_2$ | 4 | vol% |
| H$_2$O | 16–19 | vol% |

| Results of pressure loss measurements | | | | |
|---|---|---|---|---|
| Gas passage time (Hr) | 0 | 408 | 600 | 810 |
| Pressure loss (mmH$_2$O) | 60 | 62 | 63 | 59 |

While the catalysts used in these Examples consisted of calcium silicate plates impregnated with ferric sulfate, it should, of course, be obvious to those skilled in the art that this is not a limitation but a similar effect is achieved with other catalysts having the denitrifying capacity, such as chromium and vanadium.

Also, the catalyst is not limited to plates in shape but may take other forms, such as honeycombs or tubes likewise installed in parallel to the direction of gas flow so as to work as effectively.

What is claimed is:

1. In a process for controlling oxides of nitrogen in exhaust gases from combustion equipment by decomposing the oxides with oxygen and ammonia at temperatures from 700° to 1300°, the improvement which comprises arranging a catalyst assembly downstream of the contact point between the exhaust gas and ammonia, with the catalytic surfaces of the component units of the assembly substantially in parallel to the direction of gas flow, in a region where the temperature of the gas after the decomposing treatment is from 300° to 500° C., and causing said gas after said decomposing treatment to pass through the catalyst assembly, thereby decomposing residual oxides of nitrogen and ammonia in said gas to innocous substances.

2. In a process for controlling oxides of nitrogen in exhaust gases from combustion equipment by decomposing the oxides with oxygen and ammonia at temperatures from 700 ° to 1300° C., the improvement which comprises arranging a catalyst assembly downstream of the contact point between the exhaust gas and ammonia, with the catalytic surfaces of the component units of the assembly substantially in parallel to the direction of gas flow, in a region where the temperature of the gas after the decomposing treatment is from 300° and 500° C., so that the said gas after said decomposing treatment may pass through said catalyst assembly, and introducing an additional supply of ammonia, in an amount of from 0.5 to 1.5 times equivalent (in molar ratio) to the amount of nitrogen oxides in moles in said gas, into the space immediately upstream of said catalyst assembly, thereby to accelerate the decomposition of said oxides in said gas to harmless substances.

* * * * *